(12) United States Patent
El Choubassi et al.

(10) Patent No.: US 10,701,282 B2
(45) Date of Patent: Jun. 30, 2020

(54) VIEW INTERPOLATION FOR VISUAL STORYTELLING

(71) Applicant: Intel Corporation, Santa Clara, CA (US)

(72) Inventors: Maha El Choubassi, Santa Clara, CA (US); Yan Xu, Santa Clara, CA (US); Alexey M. Supikov, San Jose, CA (US); Oscar Nestares, San Jose, CA (US)

(73) Assignee: INTEL CORPORATION, Santa Clara, CA (US)

( * ) Notice: Subject to any disclaimer, the term of this patent is extended or adjusted under 35 U.S.C. 154(b) by 93 days.

(21) Appl. No.: 14/749,483

(22) Filed: Jun. 24, 2015

(65) Prior Publication Data

US 2016/0381341 A1 Dec. 29, 2016

(51) Int. Cl.
*H04N 5/262* (2006.01)
*H04N 5/222* (2006.01)
(Continued)

(52) U.S. Cl.
CPC ............. *H04N 5/2627* (2013.01); *G06T 7/50* (2017.01); *G06T 15/20* (2013.01); *H04N 5/2226* (2013.01);
(Continued)

(58) Field of Classification Search
CPC .. H04N 5/2627; H04N 13/026; H04N 13/207; G06T 7/50
See application file for complete search history.

(56) References Cited

U.S. PATENT DOCUMENTS 5,850,352 A * 12/1998 Moezzi .................. G06T 15/10
345/419
8,049,750 B2 * 11/2011 Gloudemans ........... G06T 15/20
345/419
(Continued)

FOREIGN PATENT DOCUMENTS

EP 2150065 2/2010

OTHER PUBLICATIONS

B. Donlon, "Son of Ken Burns", at "Bob Donlon's Adobe TV Blog", http://blogs.adobe.com/bobddv/2006/09/son_of_ben_kurns.html (Sep. 29, 2006).*
(Continued)

*Primary Examiner* — David N Werner
(74) *Attorney, Agent, or Firm* — Womble Bond Dickinson (US) LLP

(57) ABSTRACT

A plurality of frames of a video recorded by a video camera and depth maps of the plurality of frames are stored in a data storage. One or more target video camera positions are determined. Each frame of the plurality of frames is associated with one or more of the target video camera positions. For each frame, one or more synthesized frames from the viewpoint of the one or more target camera positions associated with that frame are generated by applying a view interpolation algorithm to that frame using the color pixels of that frame and the depth map of that frame. Users can provide their input about the new camera positions and other camera parameters through multiple input modalities. The synthesized frames are concatenated to create a modified video. Other embodiments are also described and claimed.

15 Claims, 8 Drawing Sheets

(51) Int. Cl.
| | |
|---|---|
| *G06T 15/20* | (2011.01) |
| *H04N 13/111* | (2018.01) |
| *H04N 13/271* | (2018.01) |
| *H04N 13/207* | (2018.01) |
| *G06T 7/50* | (2017.01) |

(52) U.S. Cl.
CPC ......... *H04N 5/2628* (2013.01); *H04N 13/111* (2018.05); *H04N 13/207* (2018.05); *H04N 13/271* (2018.05); *G06T 2207/10028* (2013.01); *G06T 2207/30244* (2013.01)

(56) References Cited

U.S. PATENT DOCUMENTS

| | | | | |
|---|---|---|---|---|
| 8,073,190 | B2* | 12/2011 | Gloudemans | G06T 15/20 345/419 |
| 8,154,633 | B2* | 4/2012 | Gloudemans | G06T 7/60 348/157 |
| 8,736,672 | B2* | 5/2014 | Lipton | H04N 13/0011 348/43 |
| 8,922,628 | B2* | 12/2014 | Bond | H04N 13/026 345/419 |
| 2003/0043270 | A1* | 3/2003 | Rafey | H04N 5/222 348/157 |
| 2004/0179728 | A1* | 9/2004 | Littlefield | G06T 1/0007 382/154 |
| 2005/0129325 | A1 | 6/2005 | Wu | |
| 2005/0286759 | A1 | 12/2005 | Zitnick, III et al. | |
| 2006/0285741 | A1* | 12/2006 | Subbarao | G06T 5/50 382/154 |
| 2008/0007559 | A1 | 1/2008 | Kalaiah et al. | |
| 2009/0144785 | A1 | 6/2009 | Walker et al. | |
| 2013/0208088 | A1* | 8/2013 | Ishii | G03B 35/00 348/43 |
| 2013/0215235 | A1* | 8/2013 | Russell | G03B 35/00 348/47 |
| 2013/0321581 | A1* | 12/2013 | El-Ghoroury | H04N 13/207 348/46 |
| 2014/0233915 | A1 | 8/2014 | Middleton et al. | |
| 2016/0364873 | A1* | 12/2016 | Kirmani | H04N 13/271 |

OTHER PUBLICATIONS

H. Sankoh, S. Naito, M. Harada, T. Sakata, & M. Minoh, "Free-viewpoint Video Synthesis for Sport Scenes Captured with a Single Moving Camera", 3 ITE Transactions on Media Tech. and Applications 48-57 (Jan. 2015) (Year: 2015).*
B.N. Wickramasinghe & N.D. Kodirara, "Single Camera Based Free Viewpoint Video Recording Mechanism for Premeditated Scenarios", 2012 Int'l Conf. on Advances in ICT for Emerging Regions 45-50 (Dec. 2012) (Year: 2012).*
M. Tanimoto, M.P. Tehrani, R. Fujii, & T. Yenco, "Free-Viewpoint TV", IEEE Signal Processing Mag., Jan. 2011, at 67-76 (Year: 2011).*
D. Aliprandi & E. Piccinelli, "Image-Based Three-Dimensional Free Viewpoint Video Synthesis", presented at 2009 3DTV Conf.: The True Vision—Capture, Transmission, & Display of 3D Video (May 2009) (Year: 2009).*
A.K. Dalmia & M. Trivedi, "Depth extraction using a single moving camera: an integration of depth from motion and depth from stereo", 9 Machine Vision & Apps. 43-55 (1996) (Year: 1996).*
G. Lacey, "Depth from a single camera", Trinity College Dublin, Feb. 9, 2011 (Year: 2011).*
D. Eigen, C. Puhrsch, & R. Fergus, "Depth Map Prediction from a Single Image using a Multi-Scale Deep Network", arXiv (Jun. 9, 2014) (Year: 2014).*
A. Saxena, S.H. Chung, & A.Y. Ng, "3D Depth Reconstruction form a Single Still Image", 76 Int'l J. of Computer Vision 53-69 (Jan. 2008) (Year: 2008).*
N. Birkbeck, D. Cobzaş, & Martin Jägersand, "Depth and Scene Flow from a Single Moving Camera", U. of Alberta (2010) (Year: 2010).*
J.R. Seal, D.G. Bailey, & G.S. Gupta, "Depth Perception with a Single Camera", presented at 1st Int'l Conf. on Sensing Technology (Nov. 2005) (Year: 2005).*
International Search Report and Written Opinion, dated Sep. 5, 2016, Application No. PCT/US2016/033314.
"Adaptive Re-Meshing for View Interpolation From Images With Depth or Disparity", U.S. Appl. No. 14/294,309, filed Jun. 3, 2014, First Named Inventor: Alexey M. Supikov, (32 pages).
"Moving Stills", U.S. Appl. No. 61/766,827, filed Feb. 20, 2013, First Named Inventor: Daniel C. Middleton, (19 pages).
Lhuillier, Maxime, et al., "Image Interpolation by Joint View Triangulation", IEEE Conference on Computer Vision and Pattern Recognition (CVRP '99) 2 (1999) 139-145, DOI: 10.1109/CVPR, 1999.784621 [Version 1—May 3, 2011], (7 pages).
Liu, Feng, et al., "Content-Preserving Warps for 3D Video Stabilization", ACM Transactions on Graphics (TOG), vol. 28, No. 3, Association for Computing Machinery, Inc., 2009, (9 pages).
Park, Joon H., et al., "Fast View Interpolation of Stereo Images Using Image Gradient and Disparity Triangulation", Signal Processing: Image Communication 18 (2003), Elsevier, Available online at www.sciencedirect.com, (pp. 401-416).
Stefanoski, Nikolce, et al., "Automatic View Synthesis by Image-Domain-Warping", IEEE Transactions on Image Processing, vol. 22, No. 9, Sep. 2013, pp. 3329-3341.
Zitnick, C. L., et al., "High-Quality Video View Interpolation Using a Layered Representation", ACM SIGGRAPH, vol. 23, No. 3, Aug. 2004, Association for Computing Machinery, Inc., (9 pages).
Intel Corporation, International Preliminary Report on Patentability dated Dec. 26, 2017, PCT Application No. PCT/US2016/033314.
Xiao, Jiangjian, et al., "View Interpolation for Dynamic Scenes", Europgraphics 2002, Jan. 1, 2002, 10 pages.

* cited by examiner

VIEW INTERPOLATION FOR VISUAL STORYTELLING

FIELD

One aspect of this disclosure relates to image and video processing, and more specifically to using view interpolation to create a visual story from an image or a video. Other aspects are also described.

BACKGROUND

Social media has become increasingly popular and users have great interest in sharing their experiences on social media sites with others. One way that users can share their experience with others is to capture images or record videos with their mobile device (e.g., a cellular phone or tablet) and to post them to social media sites that allow people to share images and videos with others.

Telling a good visual story often relies on having a dynamic camera perspective to focus on certain aspects of the scene that are of interest in additional detail and to show these aspects at different angles. However, current systems that enable visual media to be shared on social media sites provide the user with limited capability to dynamically control the camera viewpoint once the image/video is captured. The practice of dynamically controlling the camera viewpoint is mostly used in motion pictures (e.g., movies) and 3-D games, by professionals that have access to sophisticated and expensive imaging equipment. For the casual user who captures images/videos with his/her personal mobile device, there is limited capability to dynamically control the camera viewpoint after the image/video has been captured.

BRIEF DESCRIPTION OF THE DRAWINGS

Various aspects of this disclosure are illustrated by way of example and not by way of limitation in the figures of the accompanying drawings in which like references indicate similar elements. It should be noted that references to "an" or "one" embodiment in this disclosure are not necessarily referring to the same embodiment, and they mean at least one. Also, a given figure may be used to illustrate the features of more than one embodiment in the interest of reducing the total number of drawings, and as a result not all elements in the figure may be required for a given embodiment.

DETAILED DESCRIPTION

Figure 1:
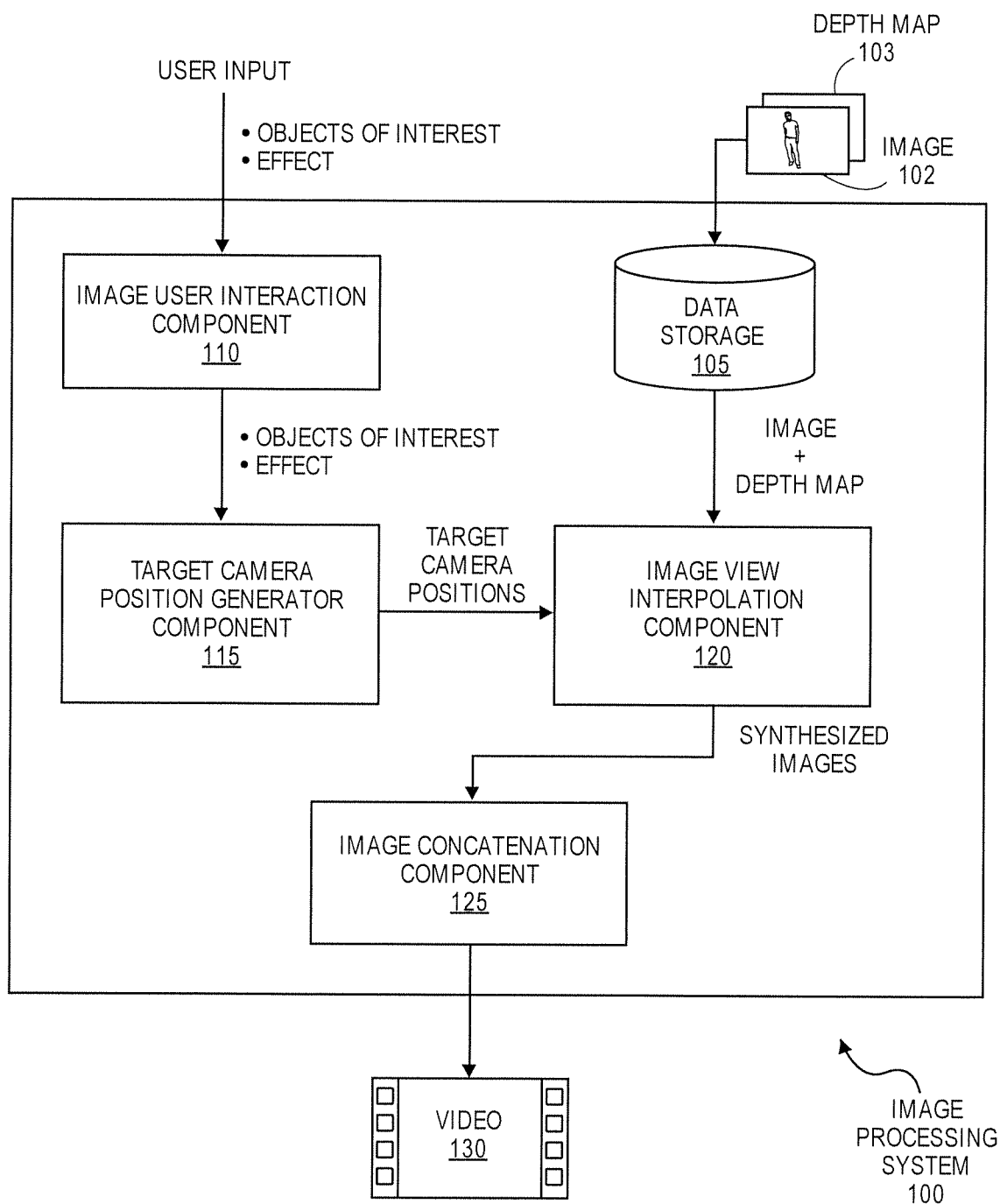
FIG. 1 is a block diagram illustrating an image processing system for creating a video from an image, according to some embodiments.

Several embodiments with reference to the appended drawings are now explained. Whenever aspects of the embodiments described here are not explicitly defined, the scope of the disclosure here is not limited only to the parts shown, which are meant merely for the purpose of illustration. Also, while numerous details are set forth, it is understood that some embodiments may be practiced without these details. In other instances, well-known circuits, structures, and techniques have not been shown in detail so as not to obscure the understanding of this description.

People are excited about capturing their experiences in images and videos and sharing them with others. The spread of smartphones with image/video capturing/recording capabilities, the emergence of new camera devices (e.g., wearable high-definition camcorders), and the increasing popularity of social media are all drivers for this growing interest in capturing/recording and sharing images and videos. A user can tell a visual story of his or her experience using images and/or videos. However, images and videos typically shared on social media sites only show a single fixed viewpoint (i.e., the viewpoint of the camera that originally captured the image or video). The user's visual story would be enhanced if the user could present multiple viewpoints of an image or video.

Impressive visual effects can be created by presenting multiple viewpoints of a scene. For example, multiple viewpoints of a scene can be captured to generate a bullet time effect. A bullet time effect is a visual effect where the passage of time appears to slow down (or stop), while the camera appears to move around a subject in the scene. For example, this type of effect was famously used in the movie "The Matrix". Producing this type of visual effect often involves setting up and configuring an expensive array of cameras. Typically, the bullet time effect is achieved by setting up an array of cameras that surround the subject and then activating the array of cameras in rapid succession (or simultaneously). The captured images are then pieced together into a video. However, creating these types of visual effects usually involves purchasing expensive equipment. Also, a great deal of video editing expertise is needed to create such visual effects. Furthermore, the viewpoints that can be captured by the array of cameras is limited by the number of cameras in the array and the particular arrangement of the cameras.

Traditional images and videos do not allow retrospectively changing the camera viewpoint after the image/video has been captured/recorded. Stated differently, once the image/video is captured/recorded, the user does not have control over the camera viewpoint. The ability to control the camera viewpoint retrospectively would give the user a much more expressive way to tell the user's visual story.

Embodiments enable a user to tell a visual story by allowing the user to virtually move the camera viewpoint retrospectively (i.e., after capturing/recording an image/video). This is achieved by leveraging depth and/or geometric information of the image/video. A view interpolation algorithm can use the depth and/or geometric information of the image/video to generate new viewpoints for the image/video. This gives the user control over the camera viewpoint even after the original image/video is captured/recorded so that the user can tell his or her visual story by emphasizing and/or de-emphasizing certain aspects of the captured/recorded image/video by moving the camera viewpoint as desired. The resulting interactive visual media is much more appealing than the static images and videos typically shared on social media sites (where the viewpoint is fixed after the image/video is captured/recorded). Moreover, embodiments provide a simple and intuitive way for the user to control the camera viewpoint to generate dynamic visual media.

FIG. 1 is a block diagram illustrating an image processing system for creating a video from an image, according to some embodiments. The image processing system 100 includes a data storage 105, an image user interaction component 110, a target camera position generator component 115, an image view interpolation component 120, and an image concatenation component 125. The components of the image processing system 100 may be implemented based on application-specific integrated circuits (ASICs), a general purpose microprocessor, a field-programmable gate array (FPGA), a digital signal controller, or a set of hardware logic structures.

The image processing system 100 operates upon an image 102 (i.e., a still image) to convert the image 102 into a video 130. The image 102 may be a digital image of a scene captured by a digital camera. The image has color pixels that represent the captured scene. The position from which the camera captured the scene is referred to herein as the original camera position. The image 102 has a depth map 103 associated with it that has information relating to the distance of the surfaces of the captured scene from the original camera position. In one embodiment, both the image 102 and the depth map 103 associated with the image 102 may be obtained from a depth-capturing digital camera. In one embodiment, the image 102 and the depth map 103 associated with the image are stored in the data storage 105 for the image processing system 100 to operate upon.

The image user interaction component 110 provides a user interface to a user and accepts user input from the user through the user interface. The image user interaction component 110 may display an image (e.g., the image 102 stored in the data storage 105) on a display (not shown) and provide an interface for the user to interact with the image. In one embodiment, the image user interaction component 110 receives user input that indicates one or more objects of interest in the image 102 and an effect to apply to the image 102. For example, the image user interaction component 110 may provide a user interface that allows the user to select one or more objects of interest in the image 102. Also, the image user interaction component 110 may provide a user interface that allows the user to select an effect to apply to the image 102. In one embodiment, the image user interaction component 110 displays a finite number of pre-defined effects (i.e., effects that were pre-loaded on the image processing system 100) on the display that the user can select from. For example, the selection of effects could include, but are not limited to: a pan effect, a rotation effect, a dolly zoom effect (an effect that changes camera field of view, focus, and zoom according to changing camera position) and a Ken Burns effect (a combination of panning and zooming). In one embodiment, the image user interaction component 110 provides a user interface that allows the user to control camera movement, as desired. Such a user interface may utilize input from a touchscreen display, an accelerometer, a gyroscope, or any combination thereof. For example, the user can touch an (x, y) position on the image 102 to be the center for the camera motion, and then use two-finger pinching gestures to move the camera closer or further in the z-dimension. This movement along the z-direction can be combined with panning and rotating camera motions, which can be mapped from accelerometer and/or gyroscope input. The image user interaction component 110 receives user input and passes the user input (e.g., the indicated objects of interest and the effect to apply to the image 102) to the target camera position generator component 115.

The target camera position generator component 115 determines one or more target camera positions based on the user input. The target camera positions are virtual camera positions (distinct from the original camera position) that are used to generate new viewpoints of the image 102, as will be described in additional detail below. As used herein, a target camera position may refer to a location of a virtual camera (e.g., in 3D space) and an orientation of the virtual camera (e.g., what direction an optical axis of the camera is facing). For example, a target camera position may be different from the original camera position by translation (e.g., change in location) and/or orientation (e.g., change in the tilt, roll, and/or yaw). In one embodiment, the target camera position generator component 115 automatically determines target camera positions based on the objects of interest and the effect indicated by the user (e.g., received from the image user interaction component 110). In one embodiment, the target camera position generator component 115 also determines a timing sequence of the target camera positions that specifies an order of the target camera positions. For example, if the object of interest is a particular person captured in the image 102 and the effect is a zoom-in effect, then a set of target camera positions are generated that starts with a camera position that is relatively far away from the person followed by camera positions that move closer to the person. The target camera position generator component 115 passes the determined target camera positions (and in some embodiments, the timing sequence of the generated target camera positions) to the image view interpolation component 120.

The image view interpolation component 120 applies a view interpolation algorithm to the image to generate synthesized images. A synthesized image is essentially an image of the originally captured scene from the viewpoint of a target camera position (that is distinct from the original camera position). The image view interpolation component 120 may use any suitable view interpolation algorithm to generate synthesized images. In one embodiment, the view interpolation algorithm uses the color pixels of the image 102 and a depth map 103 associated with the image to generate the synthesized images. The image view interpolation component 120 may generate a synthesized image for each target camera position received from the target camera position generator component 115. In one embodiment, the image view interpolation component 120 orders the synthesized images according to the timing sequence of the target camera positions. The image view interpolation component 120 passes the synthesized images to the image concatenation component 125 for further processing.

The image concatenation component 125 concatenates the synthesized images to create a video 130. In one embodiment, the image concatenation component 125 concatenates the synthesized images according to a timing sequence of the target camera positions generated by the target camera position generator component 115. In this way, the system is able to create a video 130 from an image 102. The video 130 shows the scene captured by the image 102 from various different viewpoints that were not originally captured by the image 102 in an animated fashion.

Thus, the image processing system 100 allows the user to create an animated visual story from an image 102. The image processing system 100 allows the user to specify which objects in the image 102 are of interest and what type of visual effect should be applied to the image 102. Based on the user input, the image processing system 100 automatically creates a video 130 from the image 102 that includes viewpoints of the image 102 that were not originally captured by the image 102. In this way, the image processing system 100 allows the user to retrospectively change the viewpoint of the image 102, even after the image 102 has been captured. Thus, the image processing system 100 enables the user to create impressive visual effects in a simple and intuitive manner.

Figure 2:
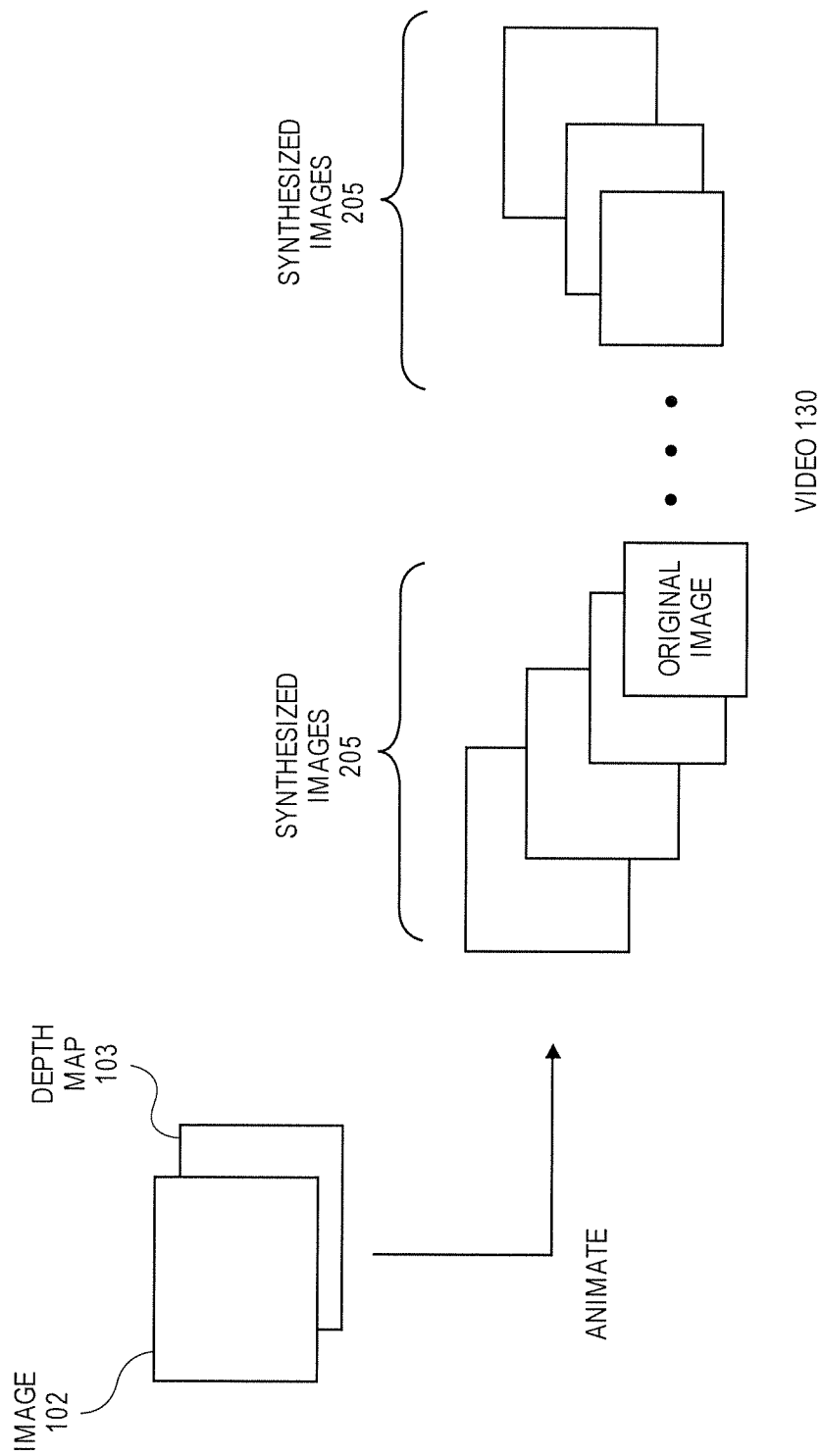
FIG. 2 is a diagram illustrating an image that is animated into a video, according to some embodiments.

FIG. 2 is a diagram illustrating an image that is animated into a video, according to some embodiments. As discussed above, a view interpolation algorithm can be applied to an image 102 to generate synthesized images 205 from the viewpoint of various different camera positions. In one embodiment, the different camera positions are specified by the user or determined based on user input (e.g., by receiving user input through image user interaction component 110). The synthesized images 205 are animated into a video by concatenating the synthesized images 205 such that each synthesized image becomes a frame of the video 130. In one embodiment, the image 102 is also included as a frame in the video. The resulting video 130 includes viewpoints that were not originally captured by the image 102.

Figure 3:
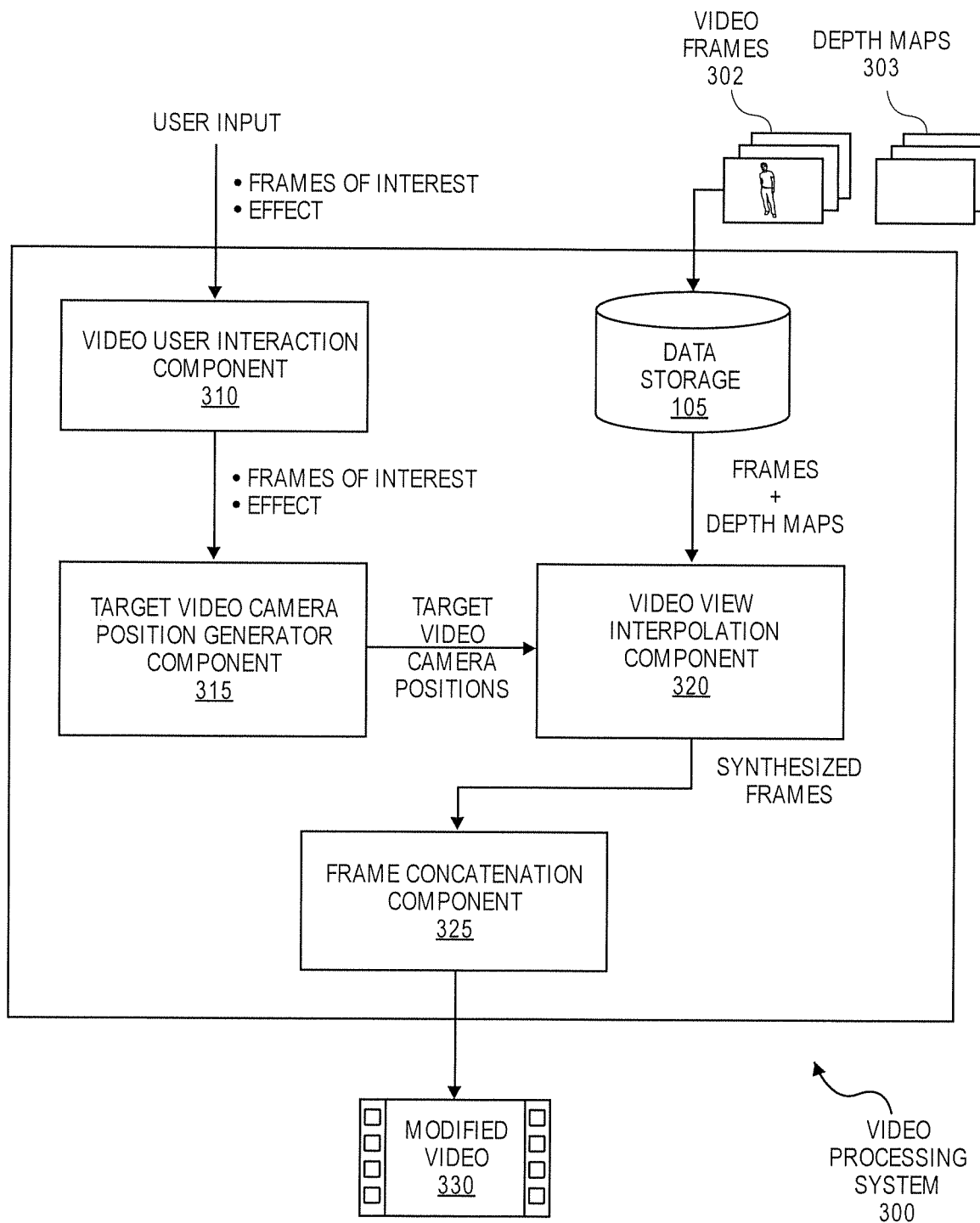
FIG. 3 is a block diagram illustrating a video processing system for creating a modified video with new viewpoints, according to some embodiments.

FIG. 3 is a block diagram illustrating a video processing system for creating a modified video with new viewpoints, according to some embodiments. The video processing system 300 includes a data storage 105, a video user interaction component 310, a target video camera position generator component 315, a video view interpolation component 320, and a frame concatenation component 325. The components of the video processing system 300 may be implemented based on application-specific integrated circuits (ASICs), a general purpose microprocessor, a field-programmable gate array (FPGA), a digital signal controller, or a set of hardware logic structures.

The video processing system 300 operates upon video frames 302 of a video to convert the video into a modified video 330 with new viewpoints. The video may be a digital video recorded by a digital video camera. Each frame of the video has color pixels that represent a scene captured by that frame. The position from which the video camera captured the frame is referred to herein as the original video camera position for that frame. Each frame has a depth map associated with it that has information relating to the distance of the surfaces of the scene captured by that frame (from the original video camera position). In one embodiment, both the video frames 302 and the depth maps 303 associated with the respective video frames 302 may be obtained from a depth-capturing digital video camera. In one embodiment, the depth map associated with a frame may be derived by analyzing other frames in the video, for example, using a structure from motion technique. In one embodiment, the video (having video frames 302) and the depth maps 303 associated with the respective video frames 302 of the video are stored in the data storage 105 for the video processing system 300 to operate upon.

The video user interaction component 310 provides a user interface to a user and accepts user input from the user through the user interface. The video user interaction component 310 may display a video (e.g., the video stored in the data storage 105) on a display (not shown) and provide an interface for the user to interact with the video. In one embodiment, the video user interaction component 310 receives user input that indicates one or more frames of interest in the video and an effect to apply to the video. For example, the video user interaction component 310 may provide a user interface that allows the user to select one or more frames of interest in the video. Also, the video user interaction component 310 may provide a user interface that allows the user to select an effect to apply to the video. In one embodiment, the video user interaction component 310 displays a finite number of pre-defined effects (i.e., effects that were pre-loaded on the video processing system 300) on the display that the user can select from. For example, the selection of effects could include a moment freeze effect, a time transition effect, and a slow motion time transition effect. In one embodiment, the video user interaction component 310 provides a user interface that allows the user to control video camera movement, as desired. Such a user interface may utilize input from a touchscreen display, an accelerometer, a gyroscope, or any combination thereof. For example, the user can touch an (x, y) position on a frame of the video to be the center for the video camera motion, and then use two-finger pinching gestures to move the video camera closer or further in the z-dimension. This movement along the z-direction can be combined with panning and rotating video camera motions, which can be mapped from accelerometer and/or gyroscope input. The video user interaction component 310 receives user input and passes the user input (e.g., the indicated frames of interest and the effect to apply to the video) to the target video camera position generator component 315.

The target video camera position generator component 315 determines one or more target video camera positions based on the user input. The target video camera positions are virtual video camera positions (distinct from the original video camera position) that are used to generate new viewpoints of the video, as will be described in additional detail below. As used herein, a target video camera position may refer to a location of a virtual video camera (e.g., in 3D space) and an orientation of the virtual video camera (e.g., what direction an optical axis of the camera is facing). For example, a target video camera position may be different from the original video camera position by translation (e.g., change in location) and/or orientation (e.g., change in the tilt, roll, and/or yaw). In one embodiment, the target video camera position generator component 315 automatically determines target video camera positions based on the frames of interest and the effect indicated by the user (e.g., received from the video user interaction component 310). In one embodiment, the target video camera position generator component 315 automatically identifies the frames of interest. For example, the frames of interest may be automatically identified based on detecting certain emotions in a frame (e.g., based on facial recognition that detects sad or happy facial expressions), by analyzing audio accompanying the video (e.g., sudden increase in sound may indicate an interesting frame), or by determining which frames the user pauses at the most. In one embodiment, the target video camera position generator component 315 also determines a timing sequence of the target video camera positions that specifies an order of the target video camera positions. In one embodiment, the target video camera position generator component 315 associates each frame of the video with one or more of the target video camera positions. This association specifies the desired viewpoint(s) for each frame. The target video camera position generator component 315 passes the determined target video camera positions (and in some embodiments, the timing sequence of the target video camera positions and/or the association of frames to target video camera positions) to the video view interpolation component 320.

The video view interpolation component 320 applies a view interpolation algorithm to one or more frames of the video to generate one or more synthesized frames. A synthesized frame is essentially a frame of the video from a viewpoint of a target video camera position (that is distinct from the original video camera position for that frame). In one embodiment, the video view interpolation component 320 generates one or more synthesized frames for a frame of the video from the viewpoint of the target camera positions associated with that frame. The video view interpolation component 320 may use any suitable view interpolation algorithm to generate synthesized frames. In one embodiment, the view interpolation algorithm uses the color pixels of a frame and a depth map associated with the frame to generate the synthesized frame(s). In one embodiment, the video view interpolation component 320 orders the synthesized frames according to the timing sequence of the target video camera positions. The video view interpolation component 320 passes the synthesized frames to the frame concatenation component 325 for further processing.

The frame concatenation component 325 concatenates the synthesized frames to create a modified video 330. In one embodiment, the frame concatenation component 325 concatenates the synthesized frames according to a timing sequence of the target video camera positions determined by the target video camera position generator component 315. In this way, the video processing system 300 is able to create a modified video 330 with new viewpoints. The modified video 330 shows the scenes recorded in the video from various viewpoints that are different from the viewpoints originally recorded by the video.

Thus, the video processing system 300 allows the user to create a visual story from a video. The video processing system 300 allows the user to specify which frames in the video are of interest and what type of visual effect should be applied to the video. Based on the user input, the video processing system 300 automatically creates a modified video 330 from the video that includes viewpoints of the video that were not originally recorded by the video. In this way, the video processing system 300 allows the user to retrospectively change the viewpoint of the video, even after the video has been recorded. Thus, the video processing system 300 enables the user to create impressive visual effects in a simple and intuitive manner.

Figure 4:
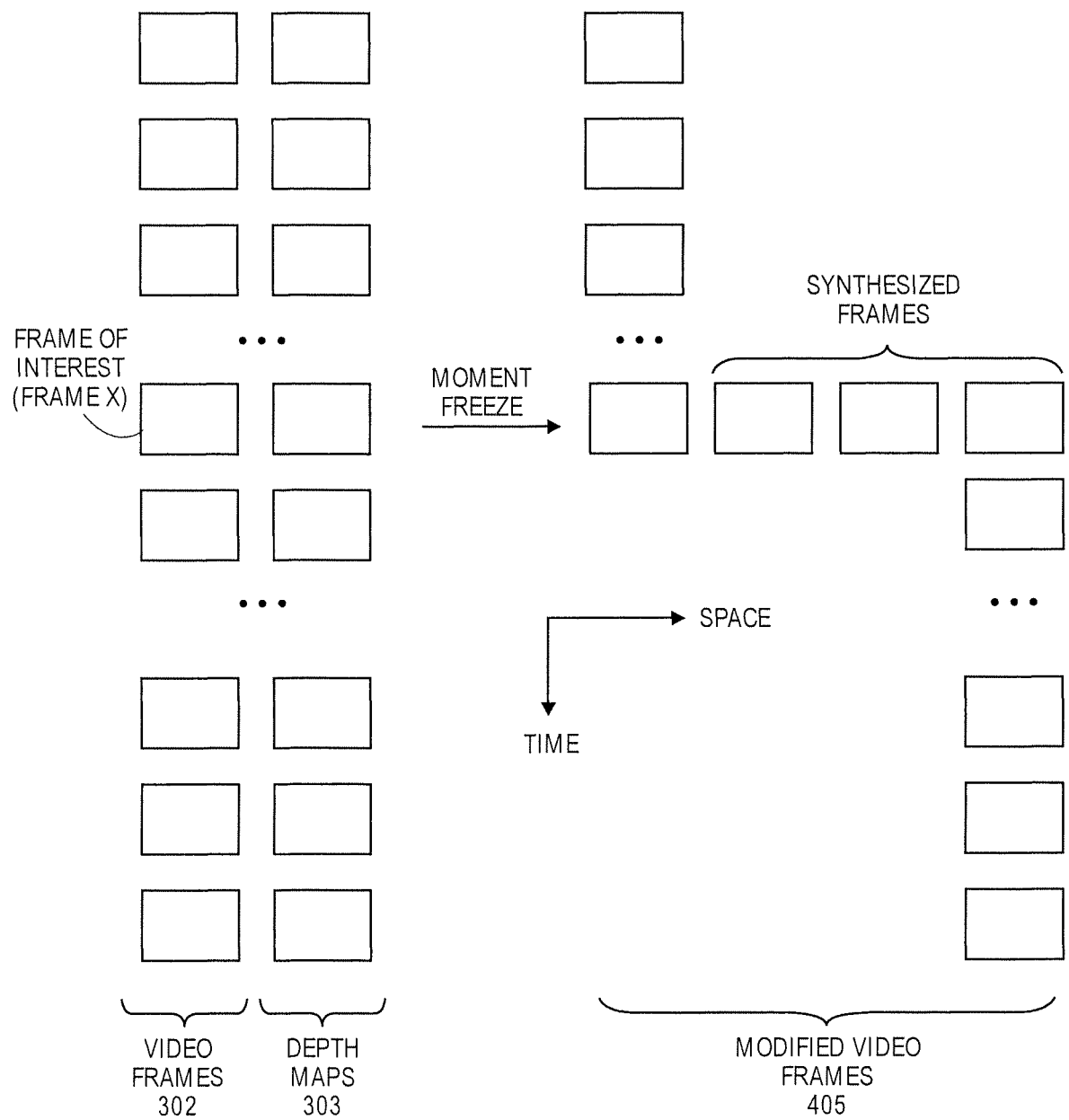
FIG. 4 is a diagram illustrating a moment freeze effect applied to a video, according to some embodiments.

FIG. 4 is a diagram illustrating a moment freeze effect applied to a video, according to some embodiments. A video recorded by a video camera includes video frames 302. In one embodiment, each frame of the video is associated with a depth map (i.e., depth maps 303). A moment freeze effect can be applied to the video to create a modified video 330 (having modified video frames 405). A moment freeze effect is a visual effect where time appears to stop (or "freeze"), while the video camera keeps moving. The moment freeze effect starts at a frame of interest. In one embodiment, the frame of interest is selected by a user. For example, in a video that captures a group of people jumping in the air together, the user may select the frame that captures the moment where everyone in the group is in the air to be the frame of interest. As shown, the frame of interest is frame X so the moment freeze effect is applied to frame X. The modified video frames 405 are the same as the video frames 302 until reaching frame X. The moment freeze effect is created by generating synthesized frames representing the scene captured in frame X from the viewpoint of multiple different video camera positions. In one embodiment, the different video camera positions are specified by the user (e.g., by receiving user input through video user interaction component 310). In another embodiment, the different video camera positions are automatically determined by the video processing system 300 (e.g., based on pre-defined video camera movement for this effect). The synthesized frames can be generated by applying a suitable view interpolation algorithm to frame X using the color pixels of frame X and the depth map associated with frame X. These synthesized frames are concatenated to create a visual effect where time appears to stop (or "freeze"), while the video camera keeps moving. Successive frames following the moment freeze effect may be synthesized frames from the viewpoint of the video camera position at which the moment freeze effect ended, in order to maintain continuity. In some cases, the moment freeze effect ends with a video camera position that is at the same position as an original video camera position. In that case, the frames following the moment freeze effect may be the same as the video frames 302 (i.e., not synthesized frames).

Figure 5:
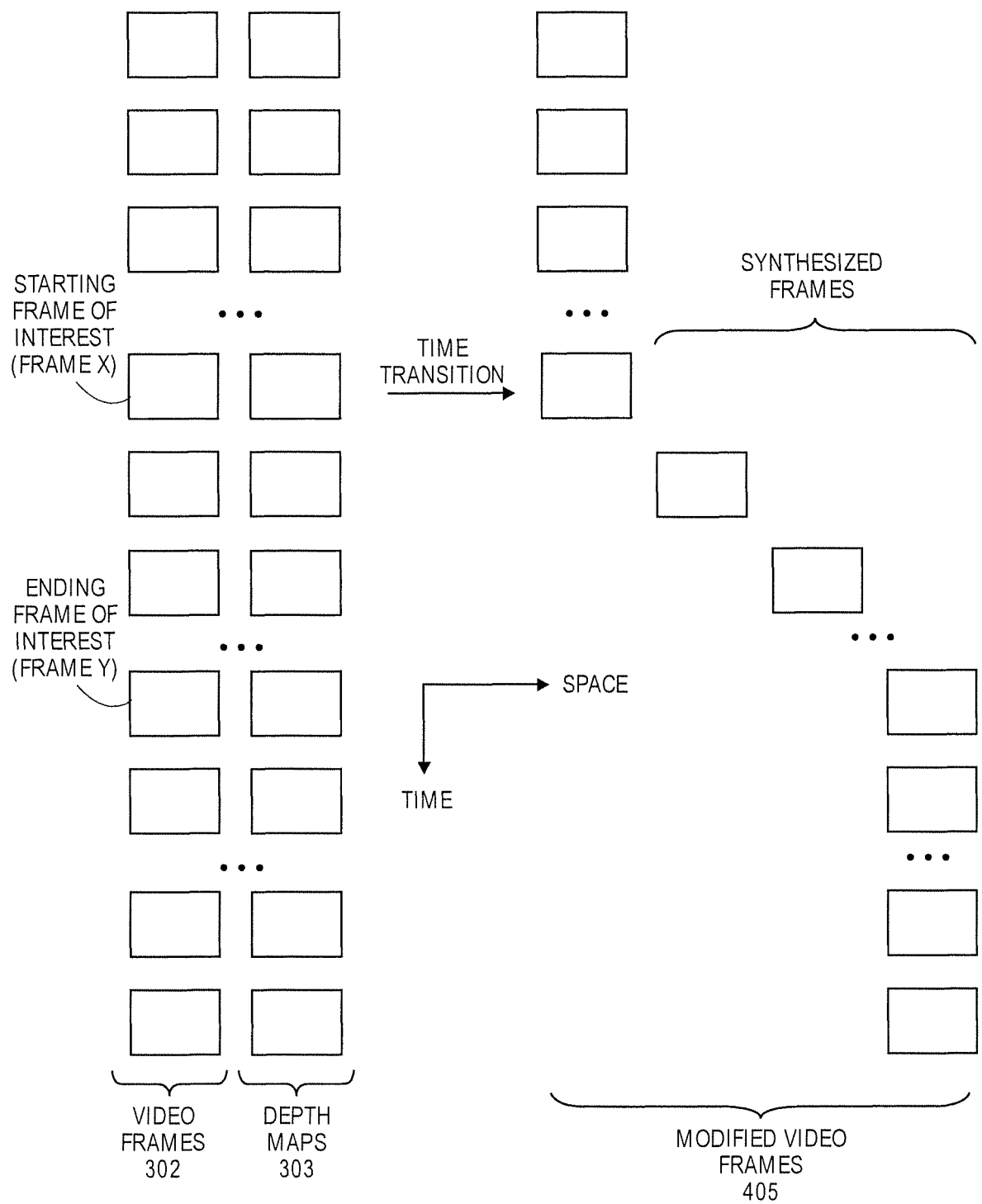
FIG. 5 is a diagram illustrating a time transition effect applied to a video, according to some embodiments.

FIG. 5 is a diagram illustrating a time transition effect applied to a video, according to some embodiments. A video recorded by a video camera includes video frames 302. In one embodiment, each frame of the video is associated with a depth map (i.e., depth maps 303). A time transition effect can be applied to the video to create a modified video 330 (having modified video frames 405). A time transition effect is a visual effect where the video camera is moving around to show viewpoints that are different from the viewpoints originally recorded by a video. The time transition effect is applied between a starting frame of interest and an ending frame of interest. In one embodiment, the starting frame of interest and the ending frame of interest are selected by a user. As shown, the starting frame of interest is frame X and the ending frame of interest is frame Y so the time transition effect is applied to frames between frame X and frame Y. The modified video frames 405 are the same as the video frames 302 until reaching frame X. The time transition effect is created by generating a synthesized frame for each frame of the video between frame X and frame Y, from the viewpoint of a video camera position that is different from the original video camera position for that frame. In one embodiment, the different video camera positions are specified by the user (e.g., by receiving user input through video user interaction component 310). In another embodiment, the different video camera positions are automatically determined by the video processing system 300 (e.g., based on pre-defined video camera movement for this effect). The synthesized frame can be generated from an original frame (e.g., frames X-Y) by applying a suitable view interpolation algorithm to the original frame using the color pixels of the original frame and the depth map associated with the original frame. The synthesized frames are concatenated to create a visual effect where the video camera is moving around to show viewpoints that are different from the viewpoints recorded in the video. Successive frames following the time transition effect may be synthesized frames from the viewpoint of the video camera position at which the time transition effect ended, in order to maintain continuity. In some cases, the video camera position moves around during the time transition effect and then returns to an original video camera position at the end of the time transition effect. In that case, the frames following the time transition effect may be the same as the video frames 302 (i.e., not synthesized frames).

Figure 6:
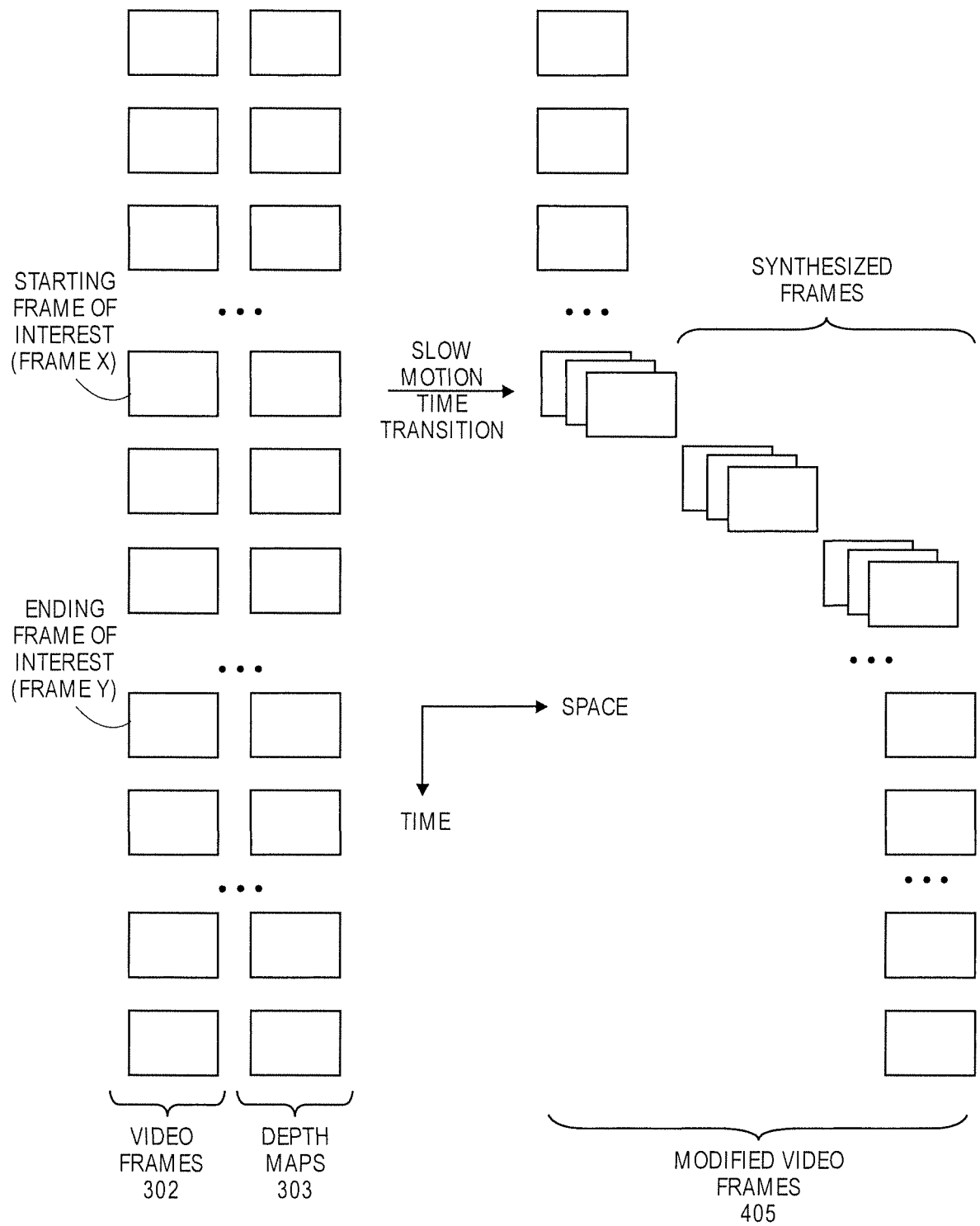
FIG. 6 is a diagram illustrating a slow motion time transition effect applied to a video, according to some embodiments.

FIG. 6 is a diagram illustrating a slow motion time transition effect applied to a video, according to some embodiments. A video recorded by a video camera includes video frames 302. In one embodiment, each frame of the video is associated with a depth map (i.e., depth maps 303). A slow motion time transition effect can be applied to the video to create a modified video 330 (having modified video frames 405). A slow motion time transition effect is a visual effect where time appears to slow down (i.e., slow motion), while the video camera is moving around to show viewpoints that are different from the viewpoints originally recorded by the video. The slow motion time transition effect is applied between a starting frame of interest and an ending frame of interest. In one embodiment, the starting frame of interest and the ending frame of interest are selected by a user. As shown, the starting frame of interest is frame X and the ending frame of interest is frame Y so the slow motion time transition effect is applied to frames between frame X and frame Y. The modified video frames 405 are the same as the video frames 302 until reaching frame X. The slow motion time transition effect is created by generating multiple synthesized frames for each frame of the video between frame X and frame Y, from the viewpoint of multiple different video camera positions that are different from the original video camera position for that frame. In one embodiment, the different video camera positions are specified by the user (e.g., by receiving user input through video user interaction component 310). In another embodiment, the different video camera positions are automatically determined by the video processing system 300 (e.g., based on pre-defined video camera movement for this effect). The synthesized frames can be generated from an original frame (e.g., frames X-Y) by applying a suitable view interpolation algorithm to the original frame using the color pixels of the original frame and the depth map associated with the original frame. The synthesized frames are concatenated to create a visual effect where time appears to slow down (i.e., slow motion), while the video camera is moving around to show viewpoints that are different from the viewpoints recorded in the video. Successive frames following the slow motion time transition effect may be synthesized frames from the viewpoint of the video camera position at which the slow motion time transition effect ended, in order to maintain continuity. In some cases, the video camera position moves around during the slow motion time transition effect and then returns to an original video camera position at the end of the slow motion time transition effect. In that case, the frames following the slow motion time transition effect may be the same as the video frames 302 (i.e., not synthesized frames).

The view interpolation algorithm leverages depth information to generate synthesized images/frames from new viewpoints. However, depth maps (e.g., depth map or depth maps 303) often have noisy values, so in one embodiment, smoothing may be applied to a depth map, and the smoothed depth map is used by the view interpolation algorithm. Using the smoothed depth map may generate perceptually more pleasant synthesized images/frames. In one embodiment, the depth map associated with an image/frame only has depth information for a portion of the image/frame (e.g., a region of interest such as the middle region of the full image/frame). In one embodiment, the depth map associated with an image/frame has the same resolution as the color pixels of the image/frame. For example, both the color pixels and the depth map of the image/frame may have a resolution of 640×480. In other embodiments, the depth map associated with an image/frame may have a lower resolution than the color pixels of the image/frame. For example, the color pixels of the image/frame may have a resolution of 640×480, while the depth map of the image/frame has a lower resolution of 128×96. Using a depth map with a lower resolution may reduce the computational complexity and memory requirements of the view interpolation algorithm. However, this may also lower the quality of the synthesized images/frames generated by the view interpolation algorithm.

In one embodiment, a cost function in terms of the desired depth/disparity is minimized to obtain the optimum depth/disparity, which can then be used to generate the synthesized images/frames. Denote the target depth/disparity values as $d_1, d_2, \ldots, d_N$ and the original values as $o_1, o_2, \ldots, o_M$. Let $d^{p,t}$ be the vector containing the unknown values at vertices of polygon p of the grid. Let $o_n$ be the depth/disparity at any point in polygon p and $w_n$ be the vector with the interpolation weights assigned to each vertex of polygon p for this point. For example, $w_n$ can be bilinear interpolation weights. Then, the quadratic cost function can be:

$$E(d_1,d_2,\ldots,d_N)=E_d(d_1,d_2,\ldots,d_N)\alpha E_s(d_1,d_2,\ldots,d_N)+\beta E_t(d_1,d_2,\ldots,d_N)$$

The data term, the spatial distortion, and the temporal distortion are defined respectively, as:

$$E_d(d_1, d_2, \ldots, d_N) = \sum_{polygon\ p} \sum_n (o_n - w_n^t d^{p,t})^2$$

$$E_s(d_1, d_2, \ldots, d_N) = \sum_{polygon\ p} f(d^{p,t})$$

$$E_t(d_1, d_2, \ldots, d_N) = \sum_{polygon\ p} \| d^{p,t} - d^{p,t-1} \|^2$$

$f(\cdot)$ is a perceptual distortion measure. For example, one possible distortion measure is the sum of squared differences between pairs $d_i^{p,t}$ and $d_j^{p,t}$ of depth/disparity values at the vertices of polygon p. The data term constrains the desired depth/disparity $d_1, d_2, \ldots, d_N$ to be close to the input depth/disparity. At the same time, the distortion terms enforce the perceptual constraints on $d_1, d_2, \ldots, d_N$ so that the generated view is perceptually acceptable. $E_s(d_1, d_2, \ldots, d_N)$ applies within the current frame/image while $E_t(d_1, d_2, \ldots, d_N)$ is used in video interpolation to smoothen distortion such as jitter across consecutive frames. Of course, many variations of the equations are possible. For example, the distortion terms can be weighted with spatial-temporal saliency so that areas of the image/frame that are more perceptually important, for example, the face of a person, are weighted more.

Figure 7:
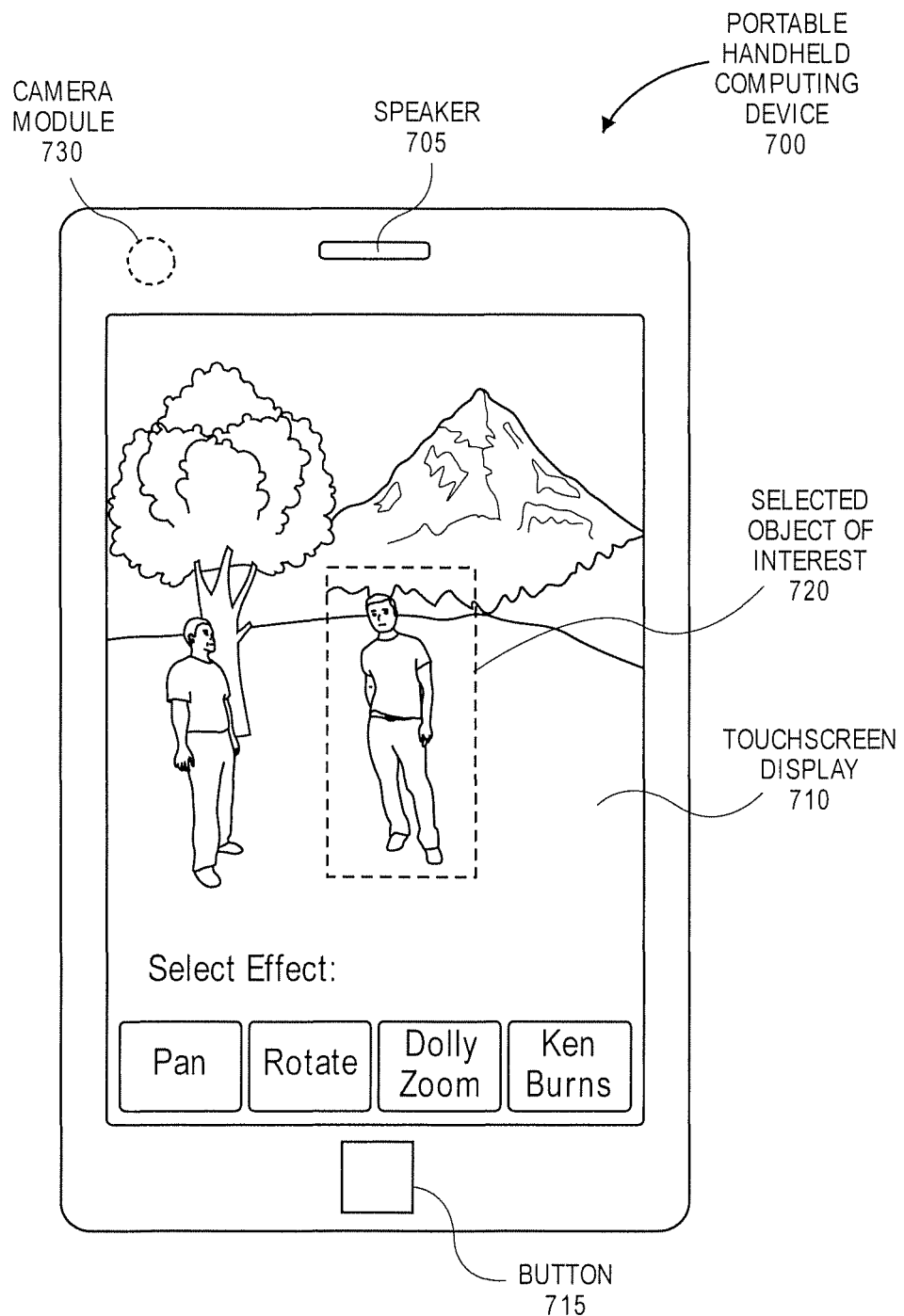
FIG. 7 is a diagram of a portable handheld computing device displaying a user interface for creating a visual story, according to some embodiments.

FIG. 7 is a diagram of a portable handheld computing device displaying a user interface for creating a visual story, according to some embodiments. The portable handheld computing device 700 may be a smartphone, tablet, laptop computer, camcorder, or similar computing device. The portable handheld computing device 700 may include a camera module 730, a speaker 705, a touchscreen display 710, a button 715, and other components typically included in such devices. In one embodiment, the camera module 730 is a depth-capturing digital camera that is capable of capturing an image and a depth map associated with the image. In one embodiment, the depth-capturing digital camera is capable of recording a video and capturing depth maps for frames of the video (i.e., a depth-capturing digital video camera). In one embodiment, the portable handheld computing device 700 includes an infrared depth sensor to capture a depth map for an image/frame, or otherwise capture depth values/characteristics of a scene. In one embodiment, the portable handheld computing device 700 includes multiple digital cameras located at different known positions of the portable handheld computing device 700 and can calculate depth values by analyzing images/frames captured simultaneously by two or more different digital cameras located at different known positions.

As shown, an image captured by the portable handheld computing device 700 is displayed on the touchscreen display 710. The captured image includes a scene with various objects such as a tree, mountains, and people. The user may interact with the portable handheld computing device 700 to select a person to be an object of interest 720. For example, the user can do this by tapping on the person with his or her finger on the touchscreen display 710 of the portable handheld computing device 700. The portable handheld computing device 700 may display a user interface on the touchscreen display 710 of the portable handheld computing device 700 that allows the user to select an effect to apply from a list of pre-defined effects (i.e., effects that were pre-loaded on the portable handheld computing device 700 or pre-loaded on an application installed on the portable handheld computing device 700). As shown, the pre-defined effects include, but are not limited to: a pan effect, a rotation effect, a dolly zoom effect, and a Ken Burns effect. Selecting a pre-defined effect applies the selected effect to the image. In one embodiment, the portable handheld computing device 700 includes one or more of the components of the image processing system 100 such as the data storage 105, the image user interaction component 110, the target camera position generator component 115, the image view interpolation component 120, and the image concatenation component 125 to create a video from the captured image based on user input, as described above.

The portable handheld computing device 700 may also display a video that it recorded and an interface for the user to select one or more frames of interest from the video, as well as an interface to select a desired effect to apply to the video. In one embodiment, the portable handheld computing device 700 includes one or more of the components of the video processing system 300 such as the data storage 105, the video user interaction component 310, the target video camera position generator component 315, the video view interpolation component 320, and the frame concatenation component 325 to create a modified video from the video based on user input, as described above.

The portable handheld computing device 700 may include one or more processors and a memory having stored therein instructions which program the one or more processors to perform any suitable combination of the image processing and video processing operations described above. The various components of the portable handheld computing 700 device may be integrated within a housing of the portable handheld computing device 700.

Figure 8:
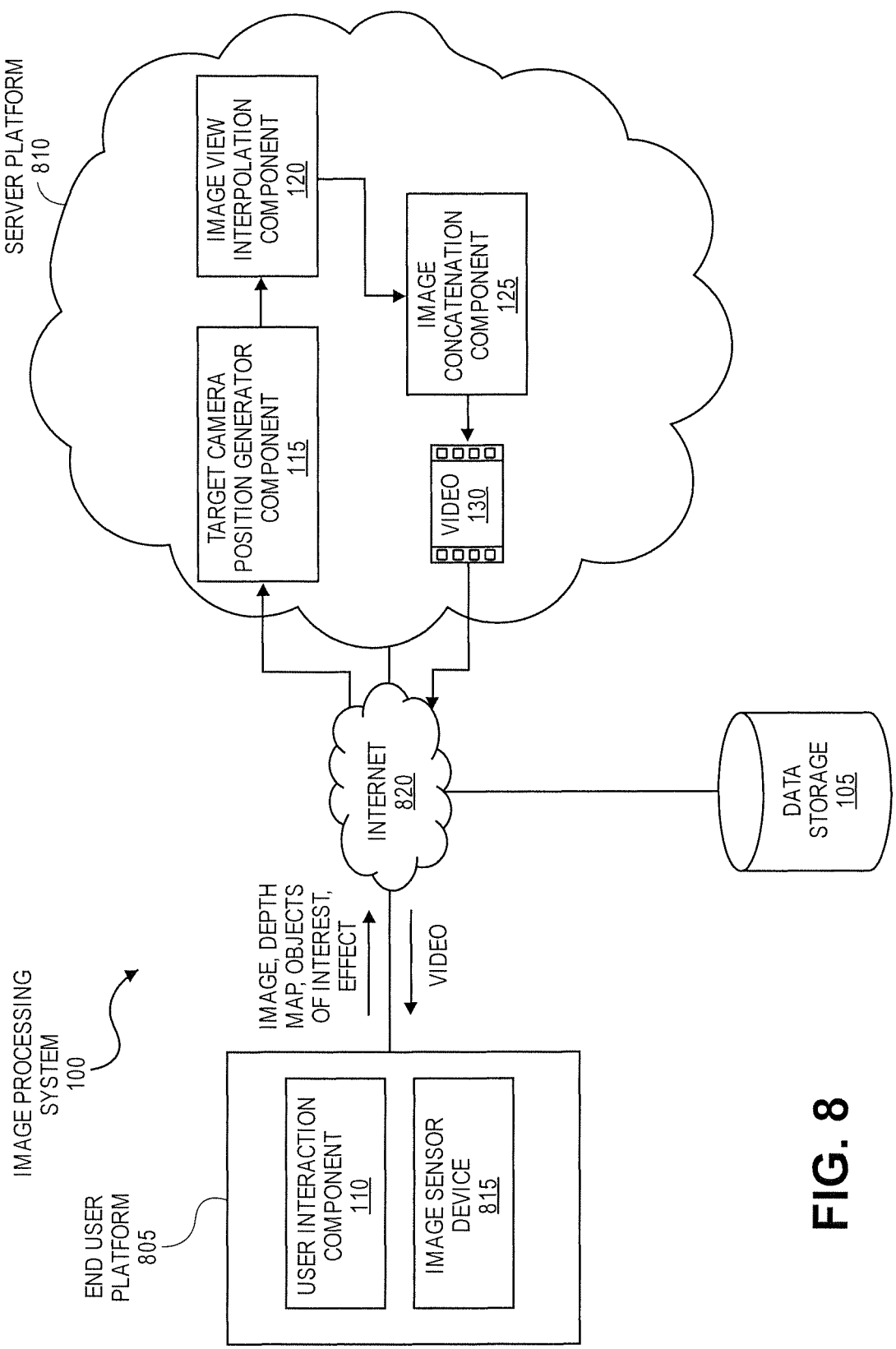
FIG. 8 is a block diagram illustrating how components of the image processing system can be distributed across a server platform and an end user platform, according to some embodiments.

FIG. 8 is a block diagram illustrating how components of the image processing system can be distributed across a server platform and an end user platform, according to some embodiments. A server platform 810 and an end user platform 805 may communicate with each other over the Internet 820. The end user platform 805 includes an imaging sensor device 815 (e.g., a digital camera device) to capture images. In one embodiment, the end user platform 805 also includes a depth-capturing device. The end user platform 805 can use the imaging sensor device 815 and the depth-capturing device to capture an image and a depth map associated with the image. The end user platform 805 also includes an image user interaction component 110. The image user interaction component 110 can perform any of the operations described above with respect to this component including accepting user input from a user of the end user platform such as an indication of an object of interest in a captured image and a desired effect to apply to the captured image. The end user platform 805 may send the captured image, the depth map associated with the captured image, an indication of one or more objects of interest in the captured image, and a desired effect to apply to the captured image to the server platform 810 over the Internet 820. In one embodiment, the end user platform 805 is a mobile device (such as portable handheld computing device 700).

The server platform 810 includes a target camera position generator component 115, an image view interpolation component 120, and an image concatenation component 125. The server platform 810 receives the captured image, the depth map associated with the captured image, the indication of one or more objects of interest in the captured image, and the desired effect to apply to the captured image. The target camera position generator component 115, the image view interpolation component 120, and the image concatenation component 125 can perform any of the operations described above with respect to these components to create a video from the captured image based on user input. The resulting video 130 is sent to the end user platform 805 over the Internet 820. Alternatively, the video 130 can be stored in a data storage 105, where the video 130 can be accessed by the user of the end user platform 805 or other users over the Internet 820.

In one embodiment, the server platform 810 may obtain an image and a depth map associated with the image from the data storage 105, where the image and/or depth map was previously captured or otherwise produced and then stored in the data storage 105. In such an embodiment, the server platform 810 communicates with the data storage 105 to retrieve the image and the depth map associated with the image. After processing the image to generate a video 130, the server platform 810 may then store the video 130 in the data storage 105, or it may serve the video 130 to an end user platform 805. In all of these instances, a combination of wired and wireless communication links that traverse the Internet 820 may be provided to upload the video to the data storage 105 or to a "cloud".

More generally, the components of the image processing system 100 described here can be distributed in various ways, across the end user platform 805 and the server platform 810, depending on criteria including power consumption optimization, bandwidth considerations, desires response time (latency), memory, or any other architectural or performance criteria.

The components of the video processing system 300 can be distributed in a similar fashion across the end user platform 805 and the server platform 810. For example, the end user platform 805 may record a video and capture depth maps for frames of the video (e.g., using a depth-capturing digital video camera device). The end user platform 805 may include a video user interaction component 310 that can perform any of the operations described above with respect to this component. For example, the video user interaction component 310 may accept user input from a user of the end user platform 805 such as an indication of one or more frames of interest and a desired effect to apply to the video. The end user platform 805 may send the frames of the video, the depth maps associated with the respective frames, an indication of one or more frames of interest, and a desired effect to apply to the video to the server platform 810 over the Internet 820.

The server platform 810 may include a target video camera position generator component 315, a video view interpolation component 320, and a frame concatenation component 325. The server platform 810 receives the frames of the video, the depth maps associated with the respective frames of the video, the indication of one or frames of interest, and the desired effect to apply to the video. The target video camera position generator component 315, the video view interpolation component 320, and the frame concatenation component 325 can perform any of the operations described above with respect to these components to create a modified video from the video recorded by the end user platform 805 based on user input. The server platform 810 may send the modified video to the end user platform 805 over the Internet 820 or may store the modified video in the data storage 105, where the modified video can be accessed by the user of the end user platform 805 or other users over the Internet 820.

In one embodiment, the server platform 810 may obtain a video and depth maps associated with frames of the video from the data storage 105, where the video and the depth maps were previously recorded or otherwise produced and then stored in the data storage 105. After processing the video to generate a modified video, the server platform 810 may then store the modified video in the data storage 105, or it may serve the modified video to the end user platform 805.

An embodiment may be an article of manufacture in which a machine-readable storage medium has stored thereon instructions which program one or more data processing components (generically referred to here as a "processor") to perform the operations described above. Examples of machine-readable storage mediums include read-only memory, random-access memory, CD-ROMs, DVDs, magnetic tape, optical data storage devices, and carrier waves. The machine-readable storage medium can also be distributed over a network so that software instructions are stored and executed in a distributed fashion. In other embodiments, some of these operations might be performed by specific hardware components that contain hardwired logic. Those operations might alternatively be performed by any combination of programmed data processing components and fixed hardwired circuit components.

An embodiment may be described as follows. A method for creating a video from an image. The method includes storing an original image of a scene captured by a camera at an original camera position, where the original image has color pixels representing the scene. The method further includes storing a depth map of the original image, determining one or more target camera positions that are distinct from the original camera position (e.g., as performed by the target camera position generator component 115 described above), generating synthesized images from a viewpoint of the one or more target camera positions by applying a view interpolation algorithm to the original image using the color pixels of the original image and the depth map of the original image (e.g., as performed by the image view interpolation component 120 described above), and concatenating the synthesized images to create a video from the synthesized images (e.g., as performed by the image concatenation component 125 described above). In one aspect, the method further includes receiving, from a user, an indication of an object of interest in the original image, receiving, from the user, a selection of an effect to apply to the original image, and determining the one or more target camera positions based on the indicated object of interest and the selected effect. In one aspect, the selected effect can be any one of: a pan effect, a rotation effect, a dolly zoom effect, and a Ken Burns effect. In one aspect, the method further includes displaying a finite number of pre-defined effects to the user for the user to select from. In one aspect, the depth map of the original image has a lower resolution than the color pixels of the original image. In one aspect, the original image is captured by a depth-capturing digital camera and the depth map is obtained from the depth-capturing digital camera. Examples of this approach for creating a video from an image are described above (e.g., image processing system 100).

An embodiment may be described as follows. A portable handheld computing device for creating a video from an image. The portable handheld computing device includes a depth-capturing digital camera to capture an original image of a scene and to capture a depth map of the original image, where the original image is captured by the depth-capturing digital camera at an original camera position and where the original image has color pixels representing the scene. The portable handheld computing device further includes a data storage to store the original image and the depth map of the original image and a target camera position generator component to determine one or more target camera positions, where the one or more target camera positions are distinct from the original camera position. The portable handheld computing device further includes an image view interpolation component to generate synthesized images from a viewpoint of the one or more target camera positions by applying a view interpolation algorithm to the original image using the color pixels of the original image and the depth map of the original image and an image concatenation component to concatenate the synthesized images to create a video from the synthesized images. In one aspect, the target camera position generator component is to receive an indication of an object of interest in the original image and an indication of an effect to apply to the original image and the target camera position generator component is to determine the one or more target camera positions based on the indicated object of interest and the indicated effect. In one aspect, the indicated effect can be any one of: a pan effect, a rotation effect, a dolly zoom effect, and a Ken Burns effect. In one aspect, the portable handheld computing device further includes a display and an image user interaction component to display, on the display, a finite number of pre-defined effects for a user to select from. In one aspect, the depth map of the original image has a lower resolution than the color pixels of the original image. Examples of this approach for creating a video from an image are described above (e.g., image processing system 100).

An embodiment may be described as follows. An article of manufacture as part of an image processing system that operates upon an original image of a scene captured by a camera at an original camera position and a depth map of the original image, where the original image has color pixels representing the scene. The article of manufacture has a computer readable medium (e.g., a "distributed" medium such as part of a cloud computing system, or a medium that is located entirely within the housing of an end user platform) on which are stored instructions that program a processor to determine one or more target camera positions that are distinct from the original camera position, generate synthesized images from a viewpoint of the one or more target camera positions by applying a view interpolation algorithm to the original image using the color pixels of the original image and the depth map of the original image, and concatenate the synthesized images to create a video from the synthesized images. In one aspect, the stored instructions program the processor to receive an indication of an object of interest in the original image, receive an indication of an effect to apply to the original image, and determine the one or more target camera positions based on the indicated object of interest and the indicated effect. In one aspect, the indicated effect can be any one of: a pan effect, a rotation effect, a dolly zoom effect, and a Ken Burns effect. Examples of this approach for creating a video from an image are described above (e.g., image processing system 100).

An embodiment may be described as follows. A system for creating a video from an image. The system includes a means for storing an original image of a scene captured by a camera at an original camera position and a depth map of the original image, where the original image has color pixels representing the scene. The system further includes a means for determining one or more target camera positions, where the one or more target camera positions are distinct from the original camera position. The system further includes a means for generating synthesized images from a viewpoint of the one or more target camera positions by applying a view interpolation algorithm to the original image using the color pixels of the original image and the depth map of the original image and a means for concatenating the synthesized images to create a video from the synthesized images. In one aspect, the means for determining one or more target camera positions is to receive an indication of an object of interest in the original image and an indication of an effect to apply to the original image and the means for determining one or more target camera positions determines the one or more target camera positions based on the indicated object of interest and the indicated effect. The indicated effect can be any one of: a pan effect, a rotation effect, a dolly zoom effect, and a Ken Burns effect. In one aspect, the system further includes a means for displaying a finite number of pre-defined effects to a user for the user to select from. Examples of this approach for creating a video from an image are described above (e.g., image processing system 100).

An embodiment may be described as follows. A method for creating a modified video. The method includes storing a plurality of frames of a video recorded by a video camera, where each frame has color pixels representing a scene. The method further includes storing a depth map for each frame of the plurality of frames, determining one or more target video camera positions, associating each frame of the plurality of frames with one or more of the target video camera positions, generating, for each frame of the plurality of frames, one or more synthesized frames from a viewpoint of the one or more target video camera positions associated with that frame by applying a view interpolation algorithm to that frame using the color pixels of that frame and the depth map of that frame, and concatenating synthesized frames to create a modified video. In one aspect, the method further includes receiving, from a user, a selection of one or more frames of interest from the plurality of frames, receiving, from the user, a selection of an effect to apply to the one or more frames of interest, and determining the one or more target video camera positions based on the selected frames of interest and the selected effect. In one aspect, the selected effect can be any one of: a moment freeze effect, a time transition effect, and a slow motion time transition effect. In one aspect, the method further includes displaying a finite number of pre-defined effects to the user for the user to select from. In one aspect, the depth map of a frame from the plurality of frames has a lower resolution than the color pixels of that frame. In one aspect, a depth map of at least one of the frames from the plurality of frames is derived using a structure from motion technique. Examples of this approach for creating a modified video are described above (e.g., video processing system 300).

An embodiment may be described as follows. A portable handheld computing device for creating a modified video. The portable handheld computing device includes a depth-capturing digital video camera to record a video that has a plurality of frames and to capture a depth map for each frame of the plurality of frames, where each frame of the plurality of frames has color pixels representing a scene. The portable handheld computing device further includes a data storage to store the plurality of frames of the video and the depth map for each frame of the plurality of frames and a target video camera position generator component to determine one or more target video camera positions and to associate each frame of the plurality of frames with one or more of the target video camera positions. The portable handheld computing device further includes a video view interpolation component to generate, for each frame of the plurality of frames, one or more synthesized frames from a viewpoint of the one or more target video camera positions associated with that frame by applying a view interpolation algorithm to that frame using the color pixels of that frame and the depth map of that frame and a frame concatenation component to concatenate synthesized frames to create a modified video. In one aspect, the target video camera position generator component is to receive an indication of one or more frames of interest from the plurality of frames and an indication of an effect to apply to the one or more frames of interest, and where the target video camera position generator component determines the one or more target video camera positions based on the indicated frames of interest and the indicated effect. In one aspect, the indicated effect can be any one of: a moment freeze effect, a time transition effect, and a slow motion time transition effect. In one aspect, the portable handheld computing device further includes a display and a video user interaction component to display a finite number of pre-defined effects for a user to select from. In one aspect, a depth map of at least one of the frames from the plurality of frames is derived using a structure from motion technique. Examples of this approach for creating a modified video are described above (e.g., video processing system 300).

An embodiment may be described as follows. An article of manufacture as part of a video processing system that operates upon a plurality of frames of a video recorded by a video camera and depth maps of the plurality of frames, where each frame of the plurality of frames has color pixels representing a scene. The article of manufacture has a computer readable medium (e.g., a "distributed" medium such as part of a cloud computing system, or a medium that is located entirely within the housing of an end user platform) on which are stored instructions that program a processor to determine one or more target video camera positions, associate each frame of the plurality of frames with one or more of the target video camera positions, generate, for each frame of the plurality of frames, one or more synthesized frames from a viewpoint of the one or more target video camera positions associated with that frame by applying a view interpolation algorithm to that frame using the color pixels of that frame and the depth map of that frame, and concatenate synthesized frames to create a modified video. In one aspect, the stored instructions program the processor to receive an indication of one or more frames of interest from the plurality of frames, receive an indication of an effect to apply to the one or more frames of interest, and determine the one or more target video camera positions based on the indicated frames of interest and the indicated effect. In one aspect, the indicated effect can be any one of: a moment freeze effect, a time transition effect, and a slow motion time transition effect. Examples of this approach for creating a modified video are described above (e.g., video processing system 300).

An embodiment may be described as follows. A system for creating a modified video. The system includes means for storing a plurality of frames of a video recorded by a video camera and a depth map for each frame of the plurality of frames, where each frame has color pixels representing a scene. The system further includes a means for determining one or more target video camera positions and associating each frame of the plurality of frames with one or more of the target video camera positions. The system further includes a means for generating, for each frame of the plurality of frames, one or more synthesized frames from a viewpoint of the one or more target video camera positions associated with that frame by applying a view interpolation algorithm to that frame using the color pixels of that frame and the depth map of that frame and a means for concatenating synthesized frames to create a modified video. In one aspect, the means for determining one or more target video camera positions is to receive an indication of one or more frames of interest from the plurality of frames and an indication of an effect to apply to the one or more frames of interest and the means for determining one or more target video camera positions determines the one or more target video camera positions based on the indicated frames of interest and the indicated effect. The indicated effect can be any one of: a moment freeze effect, a time transition effect, and a slow motion time transition effect. In one aspect, the system further includes a means for displaying a finite number of pre-defined effects to a user for the user to select from. Examples of this approach for creating a modified video are described above (e.g., video processing system 300).

While certain embodiments have been described and shown in the accompanying drawings, it is to be understood that such embodiments are merely illustrative of and not restrictive on the broad disclosure, and that this disclosure is not limited to the specific constructions and arrangements shown and described, since various other modifications may occur to those of ordinary skill in the art.

What is claimed is:

1. A method for creating a modified video, comprising:
   storing a plurality of frames of a single video stream recorded by a single digital video camera at a fixed location, wherein each frame of the plurality of frames includes color pixels representing a scene and an associated depth map;
   receiving, from a user, a selection of a frame of interest from the plurality of frames, and in response marking a timing sequence of interest in the plurality of frames, wherein the timing sequence of interest has a starting frame and an ending frame;
   receiving, from the user, a selection of an effect to apply to the user-selected frame of interest, wherein the effect is one of a moment freeze effect, a time transition effect, or a slow motion time transition effect;
   determining one or more target video camera positions based on the user-selected frame of interest and the user-selected effect, the one or more target video camera positions comprising a location of a virtual camera and an orientation of the virtual camera utilized to generate a viewpoint from the single video stream;
   associating each frame of the timing sequence of interest with the one or more target video camera positions;
   generating, for each frame of the timing sequence of interest, one or more synthesized frames from a viewpoint of the one or more target video camera positions associated with that frame of the timing sequence of interest, by applying a view interpolation algorithm to that frame using the color pixels of that frame and the depth map of that frame wherein the view interpolation algorithm produces the one or more synthesized frames; and
   concatenating the synthesized frames to create a modified video stream in which the timing sequence of interest in the plurality of frames of the single video stream has been replaced with the concatenated synthesized frames.

2. The method of claim 1, further comprising:
   displaying a finite number of pre-defined effects to the user for the user to select from.

3. The method of claim 1, wherein the depth map of a frame from the plurality of frames has a lower resolution than the color pixels of that frame.

4. The method of claim 1, wherein the depth map depth map is generated based at least at part on a determined set of target disparity values.

5. A portable handheld computing device for creating a modified video, comprising:
   a single digital video camera at a fixed location to record a single video stream that has a plurality of frames, wherein each frame of the plurality of frames has i) color pixels representing a scene and ii) an associated depth map;
   a data storage to store the plurality of frames;
   a target video camera position generator component to:
   receive an indication of one or more user-selected frames of interest from the plurality of frames and an indication of a user-selected effect to apply to the one or more user-selected frames of interest;
   determine one or more target video camera positions based on the user-selected frames of interest and the user-selected effect, the one or more target video camera positions comprising a location of a virtual camera and an orientation of the virtual camera utilized to generate a plurality of viewpoints of the single video stream, and wherein the user-selected effect is any one of: a moment freeze effect, a time transition effect; and a slow motion time transition effect; and
   in response to the indication of the one or more user-selected frames of interest, mark a timing sequence of interest in the plurality of frames wherein the timing sequence of interest has a starting frame and an ending frame;
   a video view interpolation component to generate, for each frame of the timing sequence of interest, one or more synthesized frames from a viewpoint of the plurality of viewpoints of the one or more target video camera positions associated with that frame by applying a view interpolation algorithm to that frame using the color pixels and the depth map of that frame, wherein the view interpolation algorithm produces the one or more synthesized frames; and
   a frame concatenation component to concatenate the synthesized frames to create a modified video stream in which the sequence of interest in the plurality of frames of the single video stream has been replaced with the concatenated synthesized frames.

6. The portable handheld computing device of claim 5, further comprising:
 a display; and
 a video user interaction component to display a finite number of pre-defined effects for a user to select from.

7. The portable handheld computing device of claim 5, wherein the depth map depth map is generated based at least at part on a determined set of target disparity values.

8. A method for creating a video from an image, comprising:
 storing an original image of a scene captured by a single digital camera at an original fixed camera position, wherein the original image has i) color pixels representing the scene and ii) an associated depth map;
 receiving, from a user, an indication of a user-selected object of interest in the original image;
 receiving, from the user, a selection of an effect to apply to the original image, wherein the selected effect is any one of: a pan effect, a rotation effect, a dolly zoom effect, and a Ken Burns effect;
 determining one or more target camera positions that are distinct from the original camera position based on the user-selected object of interest and the user-selected effect, the one or more target video camera positions comprising a location of a virtual camera and an orientation of the virtual camera utilized to generate a plurality of viewpoints of the original image;
 generating synthesized images from a viewpoint of the plurality viewpoints of the one or more target camera positions by applying a view interpolation algorithm to the original image using the color pixels and the depth map of the original image, wherein the view interpolation algorithm produces the synthesized images from the original image captured by the single digital camera and not from any images captured by other digital cameras; and
 concatenating the synthesized images to create a video from the synthesized images.

9. The method of claim 8, further comprising:
 displaying a finite number of pre-defined effects to the user for the user to select from.

10. The method of claim 8, wherein the depth map of the original image has a lower resolution than the color pixels of the original image.

11. The method of claim 8, wherein the depth map depth map is generated based at least at part on a determined set of target disparity values.

12. A portable handheld computing device for creating a video from an image, comprising:
 a depth-capturing digital camera to capture an original image of a scene when the camera is at a fixed location, wherein the original image is captured by the depth-capturing digital camera at an original camera position and wherein the original image has i) color pixels representing the scene and ii) an associated depth map;
 a data storage to store the original image including the depth map;
 a target camera position generator component to:
  receive an indication of a user-selected object of interest in the original image and an indication of a user-selected effect to apply to the original image, and
  determine one or more target camera positions based on the user-selected object of interest and the user-selected effect, the one or more target video camera positions comprising a location of a virtual camera and an orientation of the virtual camera utilized to generate a plurality of viewpoints of the original image, and wherein the user-selected effect is any one of: a pan effect, a rotation effect, a dolly zoom effect, and a Ken Burns effect;
 an image view interpolation component to generate synthesized images from a viewpoint of the plurality of viewpoints of the one or more target camera positions by applying a view interpolation algorithm to the original image using the color pixels and the depth map of the original image wherein the view interpolation algorithm produces the synthesized images from the original image captured by the depth capturing digital camera and not from any images captured by other digital cameras; and
 an image concatenation component to concatenate the synthesized images to create a video from the synthesized images.

13. The portable handheld computing device of claim 12, further comprising:
 a display; and
 an image user interaction component to display, on the display, a finite number of pre-defined effects for a user to select from.

14. The portable handheld computing device of claim 12, wherein the depth map of the original image has a lower resolution than the color pixels of the original image.

15. The portable handheld computing device of claim 12, wherein the depth map depth map is generated based at least at part on a determined set of target disparity values.

* * * * *